United States Patent
Iizuka

(10) Patent No.: US 7,330,521 B2
(45) Date of Patent: Feb. 12, 2008

(54) CORRELATOR AND RECEIVER INCLUDING THE SAME

(75) Inventor: Kunihiko Iizuka, Sakurai (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 788 days.

(21) Appl. No.: 10/626,578

(22) Filed: Jul. 25, 2003

(65) Prior Publication Data

US 2005/0089122 A1 Apr. 28, 2005

(30) Foreign Application Priority Data

Jul. 26, 2002 (JP) ............... 2002-218779

(51) Int. Cl.
*H03D 1/00* (2006.01)
*H04B 1/69* (2006.01)

(52) U.S. Cl. ...................... 375/343; 375/130

(58) Field of Classification Search .............. 375/130, 375/139, 142, 143, 150, 152, 343; 708/314, 708/422, 426
See application file for complete search history.

(56) References Cited

U.S. PATENT DOCUMENTS

| | | | |
|---|---|---|---|
| 5,363,108 A | | 11/1994 | Fullerton |
| 5,701,124 A | * | 12/1997 | Ichimura et al. ............... 341/50 |
| 6,493,404 B1 | | 12/2002 | Iizuka et al. |
| 6,697,444 B1 | * | 2/2004 | Iizuka et al. ................. 375/343 |
| 6,707,409 B1 | * | 3/2004 | Ignjatovic et al. ........... 341/143 |
| 7,039,134 B1 | * | 5/2006 | Avital et al. ................. 375/343 |

FOREIGN PATENT DOCUMENTS

| | | |
|---|---|---|
| JP | 5-59978 U | 8/1993 |
| JP | 6-120837 A | 4/1994 |
| WO | WO-96/09694 A1 | 3/1996 |
| WO | WO-00/35096 A2 | 6/2000 |

OTHER PUBLICATIONS

Newaskar et al., "A/D Precision Requirements for an Ultra-Wideband Radio Receiver," Proceedings SIPS '02, Oct. 2002, pp. 270-275, San Diego, California.
Khairy et al., Global Telecommunications Conference, Conference 1995. GLOBECOM 95., IEEE, pp. 1894-1898, (1995).

* cited by examiner

*Primary Examiner*—Young T. Tse
(74) *Attorney, Agent, or Firm*—Birch, Stewart, Kolasch & Birch, LLP.

(57) ABSTRACT

A correlator which can be adapted to a receiver for impulse radio includes a multiplier for multiplying a received impulse train by a received template train, an analog integrator for integrating the result of the multiplication, and a quantizer quantizing the result of the integration, which result is supplied to a digital integrator. An adder is provided on the input side of the analog integrator, and a negative feedback path negatively feeds the result of the quantization back to the analog integrator via the adder. Quantization errors occurring in the quantizer are negatively fed back to the analog integrator and thereby integrated, then quantized by the quantizer again. As a result, it is possible to reduce quantization errors and to improve the S/N ratio.

24 Claims, 10 Drawing Sheets

CORRELATOR AND RECEIVER INCLUDING THE SAME

The present application claims priority under 35 U.S.C. §119 to Japanese Patent Application No. 2002-218779, filed Jul. 26, 2002, the entire disclosure of which is hereby incorporated by reference.

BACKGROUND OF THE INVENTION

1. Field of the Invention

The present invention relates to a correlator (matched filter) for examining the correlation between an input impulse train (string) and a time-series signal, and particularly relates to a correlator for UWB (Ultra Wide Band) communication and a receiver including the correlator.

2. Description of Related Art

Recent explosive growth of various information-communication devices typified by mobile phones and PDAs has accelerated the shortage of available frequency bands. In the meantime, today's highly-networked information society boosts demand for multimedia mobile communications utilizing time-varying (animation) images and great amounts of data.

In this background, what has been researched is impulse radio (Ultra Wide Band Radio, UWB Radio) technology which opens the way for realizing communication or instrumentation (radar) without causing interferences with conventional radio communications, by means of impulses with minimum power spectral density, which can broadly spread the spectrum (from very low frequency to GHz range) (cf. Puneet Newaskar, Raul Blazquez, and Anantha Chandrakasan, "*A/D Precision Requirements for an Ultra-Wideband Radio Receiver*", Proceedings SIPS '02, San Diego, Calif., pp. 270-275, October 2002).

Referring to FIGS. 1 and 4, an example of this impulse radio is described below. FIG. 1 illustrates a monocycle for the impulse radio. A monocycle (unit cycle) 10 is approximated by Equation 1.

$$S(t) = \frac{\tau}{t}\exp(-(\tau/t)^2) \qquad \text{[Equation 1]}$$

In this equation, "τ" indicates a time constant for determining the width of the monocycle.

In the impulse radio, communication or instrumentation is performed using a time-series signal in which a monocycle 10 where τ is typically in the range of 0.1 nanosecond to 1 nanosecond is repeated at intervals (e.g. in the range of 10 nanosecond to 1000 nanosecond) longer than τ.

FIG. 2 illustrates an example of a template for the impulse radio. A template 20 is equivalent to the difference between two monocycles being shifted from each other for $(2^{0.5})\tau$. The cross-correlation between this template 20 and the monocycle 10 is illustrated as a graph of a correlation 30 in FIG. 3.

Thus, when the monocycle 10 is received and the correlation between this monocycle 10 and the template 20 is figured out, a correlation value is: 0, provided that the timing of the monocycle 10 is in agreement with the timing of the template 20; positively maximum, provided that the monocycle is ahead of the template for $\tau/2^{0.5}$; or negatively maximum, provided that the monocycle is behind the template for $\tau/2^{0.5}$. On the basis of this principle, communication or instrumentation using an impulse train having been subjected to pulse position modulation is performed.

Referring to FIG. 4, a method for transmitting binary data by means of impulse radio will be described. In this example, an average interval of transmitting a monocycle is T/N. For spread spectrum and channel multiplexing, the instant of transmitting the monocycle is varied using a pseudo-random code sequence. More specifically, in accordance with the value of the pseudo-random code which is either +1 or −1, it is determined whether the instant of the transmission is retarded for Δt or advanced for Δt, from an instant determined by the average transmission interval.

To transmit sets of binary data +1 and −1 at intervals T, an impulse train 41 indicated by SL(t) is used for the set of data +1. The impulse train 41 repeatedly transmits the monocycle for N times, and instants of the transmission are $\tau/2^{0.5}$ later than the above-mentioned retarded or advanced instants.

When the set of binary data −1 is transmitted, an impulse train 42 indicated by SE(t) is used. The impulse train 42 repeatedly transmits the monocycle for N times, and the instants of the transmission are $\tau/2^{0.5}$ earlier than the above-mentioned retarded or advanced instants.

To demodulate the data in response to the receipt of the impulse train 41 or 42, a template train 43 indicated by TP(t) is used. This template train 43 is a signal in which the template 20 is repeated for N times, and the templates 20 are generated at the above-mentioned retarded or advanced instants.

A receiver which has received the impulse train 41 or 42 figures out the correlation between the impulse train 41 or 42 and the template train 43. Here, it is assumed that, using an appropriate means (e.g. delay lock loop) for typical communications, the received impulse train 41 or 42 is in sync with the template train 43.

When the received signal is the impulse train 41, a correlation value between each of the monocycles 10 and each of the templates 20 is a negative maximum value so that it is possible to obtain a negative value as a correlation value which is figured out by adding the negative maximum value for N times. In contrast, when the received signal is the impulse train 42, a correlation value between each of the monocycles 10 and each of the templates 20 is a positive maximum value so that it is possible to obtain a positive value as a correlation value figured out by adding the positive maximum value for N times.

For instance, U.S. Pat. No. 5,363,108 to Fullerton, titled "TIME DOMAIN RADIO TRANSMISSION SYSTEM", discloses a technique for communication and a radar device utilizing impulse radio, as illustrated in a block diagram in FIG. 10.

According to the block diagram in FIG. 10 illustrating a transmitter receiver of the radar device, a received signal is: in a mixer 230, multiplied by a pattern generated by a template generator 232; integrated by an analog integrator 250; and amplified by an amplifier 252. Then the received signal is sampled by a sample and hold 254, quantized in an A/D converter 256, and finally integrated by a digital integrator 262 so that a correlation value is produced.

However, according to this conventional art, since a quantization error arises in the signal each time the A/D converter 256 carries out the quantization, a SN (Signal to Noise) ratio of the signal deteriorates. To improve the SN ratio, it is necessary to increase the quantifying bit number of the A/D converter 256. However, this significantly increases the power consumption.

SUMMARY OF THE INVENTION

The objective of the present invention is to provide a correlator which is suitably used as a part of a receiver for impulse radio. More specifically, the objective of the present invention is to provide (i) a correlator which receives an impulse train and figures out a correlation between the impulse train and a predetermined time-series pattern, in the correlator a quantization error caused in the process of quantization being reduced, and (ii) a receiver including the correlator.

To achieve this objective, a first correlator in accordance with the present invention is characterized by comprising: a multiplier for multiplying an input signal by a predetermined time-series signal; an integrator for integrating an output (i) from the multiplier; a quantizer for quantizing an output (ii) from the integrator; and a negative feedback path for negatively feeding an output (iii) from the quantizer back to the integrator.

According to this arrangement, since the output (iii) is negatively fed back to the integrator, a quantization error in the output (iii), which has been arisen in the process of quantization, is negatively fed back to the integrator and integrated thereby, and then quantized by the quantizer again.

Thus, at least a part of the quantization error which has been arisen in the process of quantization is cancelled out by the quantization error being negatively fed back, and hence a quantization error outputted from the quantizer to the outside can be significantly decreased.

To achieve the above-mentioned objective, a second correlator of the present invention is characterized by comprising: a multiplier for multiplying an input signal by a predetermined time-series signal; a first integrator for integrating an output (a) from the multiplier; a sampling circuit for sampling an output (b) from the first integrator; a second integrator for integrating an output (c) from the sampling circuit; a quantizer for quantizing an output (d) from the second integrator; and a negative feedback path for negatively feeding an output (e) from the quantizer back to the second integrator.

According to this arrangement, a quantization error can be significantly decreased as in the first correlator of the present invention.

Further, since the first integrator requiring quick response and the second integrator having a long holding time are provided to be independent from each other, the overall power consumption of the integrators can be reduced. More specifically, the load-carrying capacity of the first integrator is reduced and as a result the power consumption thereof is reduced, while the output from the first integrator is integrated by the second integrator which operates at a low speed, uses less power, and has a long holding time. Thus, it is possible to reduce the overall power consumption.

For a fuller understanding of the nature and advantages of the invention, reference should be made to the ensuing detailed description taken in conjunction with the accompanying drawings.

DESCRIPTION OF THE INVENTION

Referring to FIGS. 1-9, Embodiments of the present invention will be described below.

First Embodiment

Figure 5:
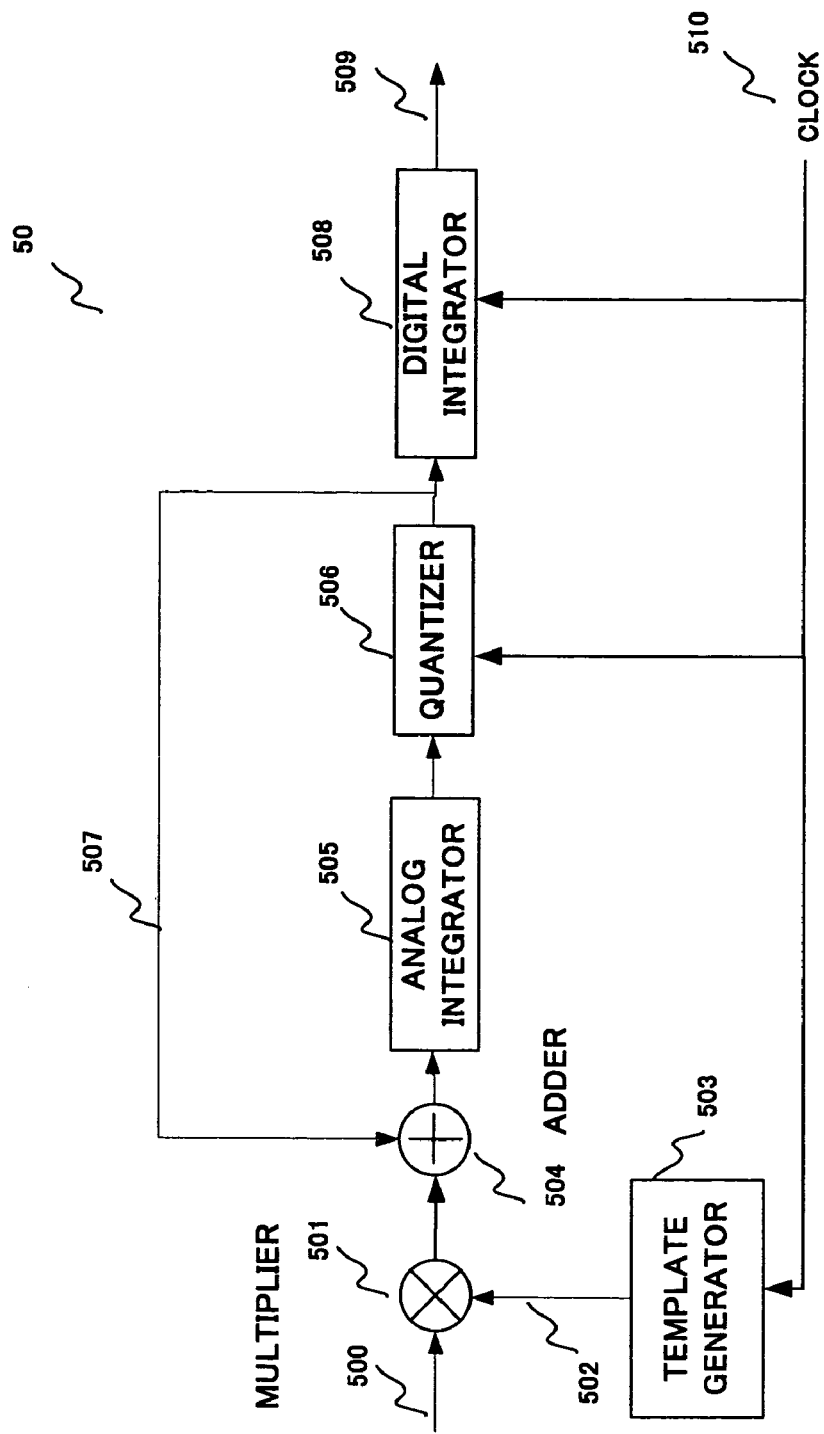
FIG. 5 is a block diagram, illustrating a substantial part of a correlator in accordance with First Embodiment of the present invention.

The following will describe First Embodiment of the present invention with reference to FIG. 5.

Upon the input of an input signal 500 which is an impulse train from an impulse radio transmitter, a correlator 50 in accordance with the present embodiment calculates a correlation value between this input signal 500 and a template train 502, and as a digital correlation output signal 509, the correlator 50 outputs the result of the calculation. The correlator 50 includes a multiplier 501, a template generator 503, an adder 504, an analog integrator 505 (integrator A), a quantizer 506, and a digital integrator 508 (integrator B).

Figure 1:
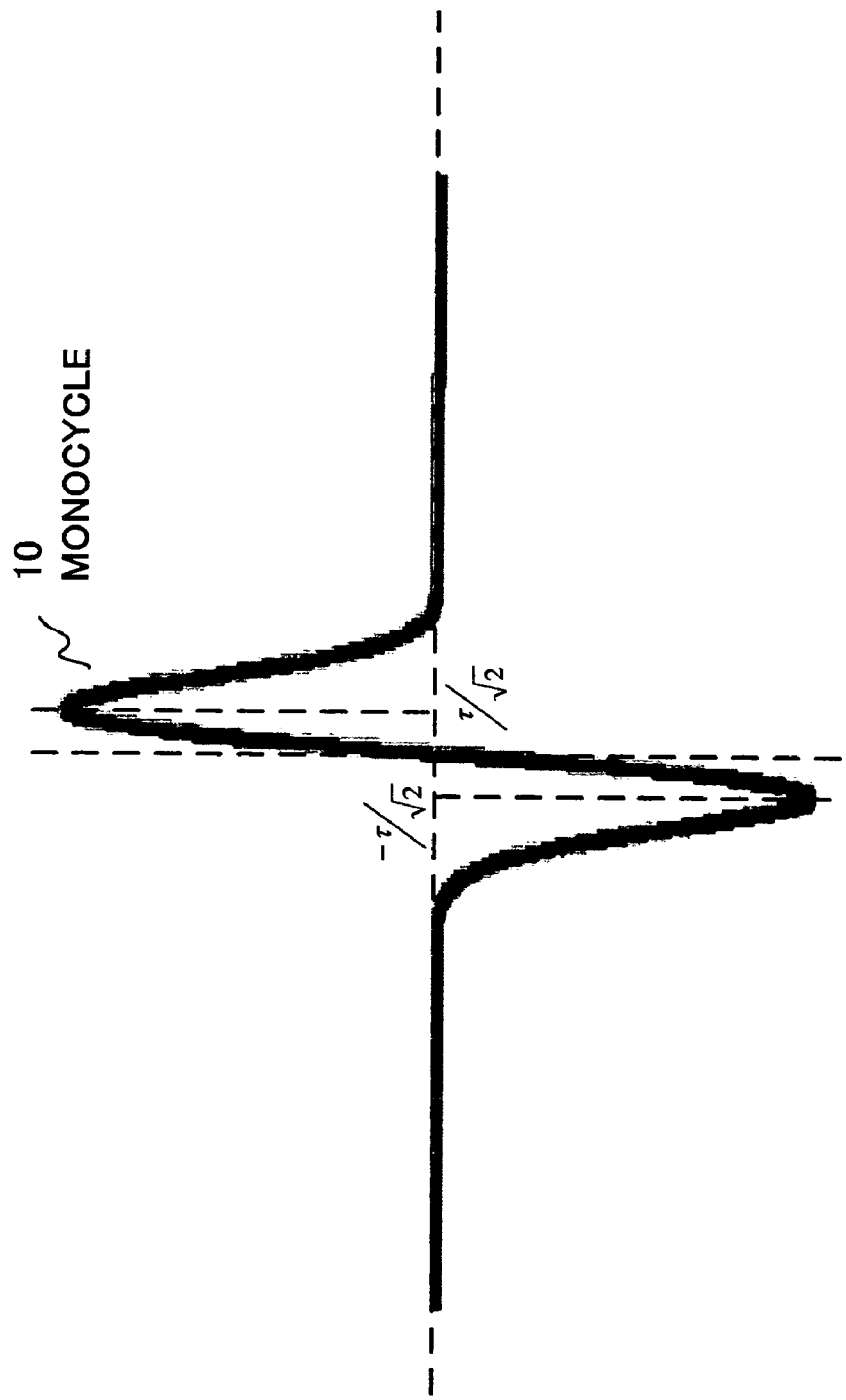
FIG. 1 is a waveform chart, illustrating an example of a waveform of a monocycle for impulse radio.
Figure 2:
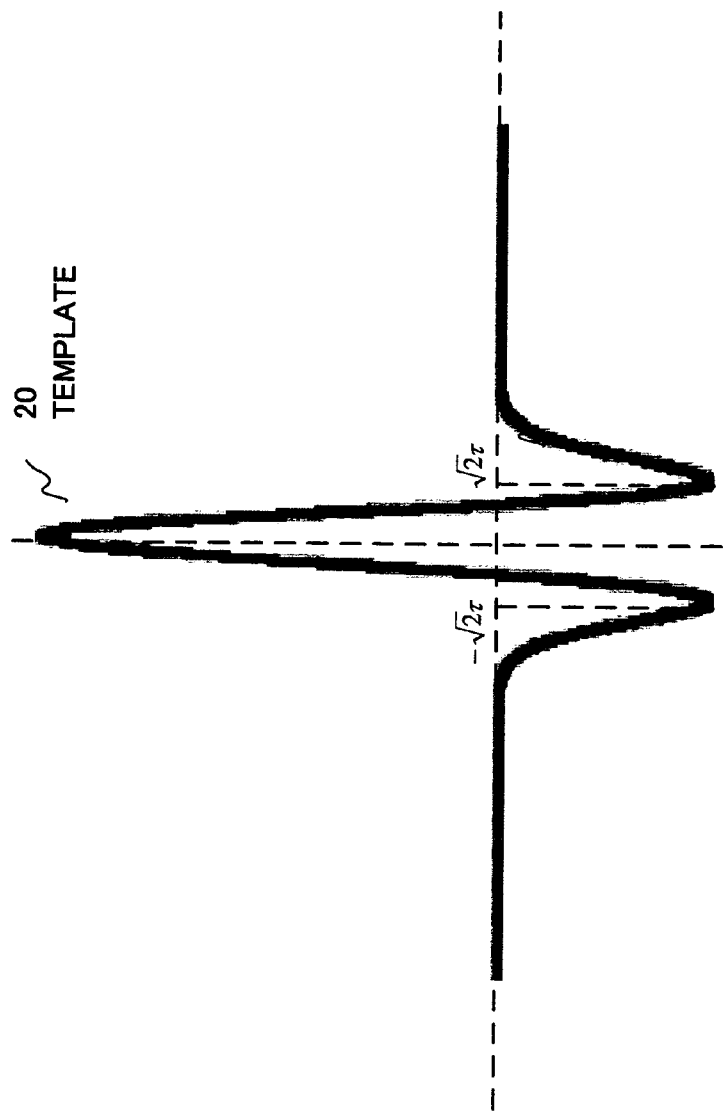
FIG. 2 is a waveform chart, illustrating an example of a waveform of a template for impulse radio.
Figure 3:
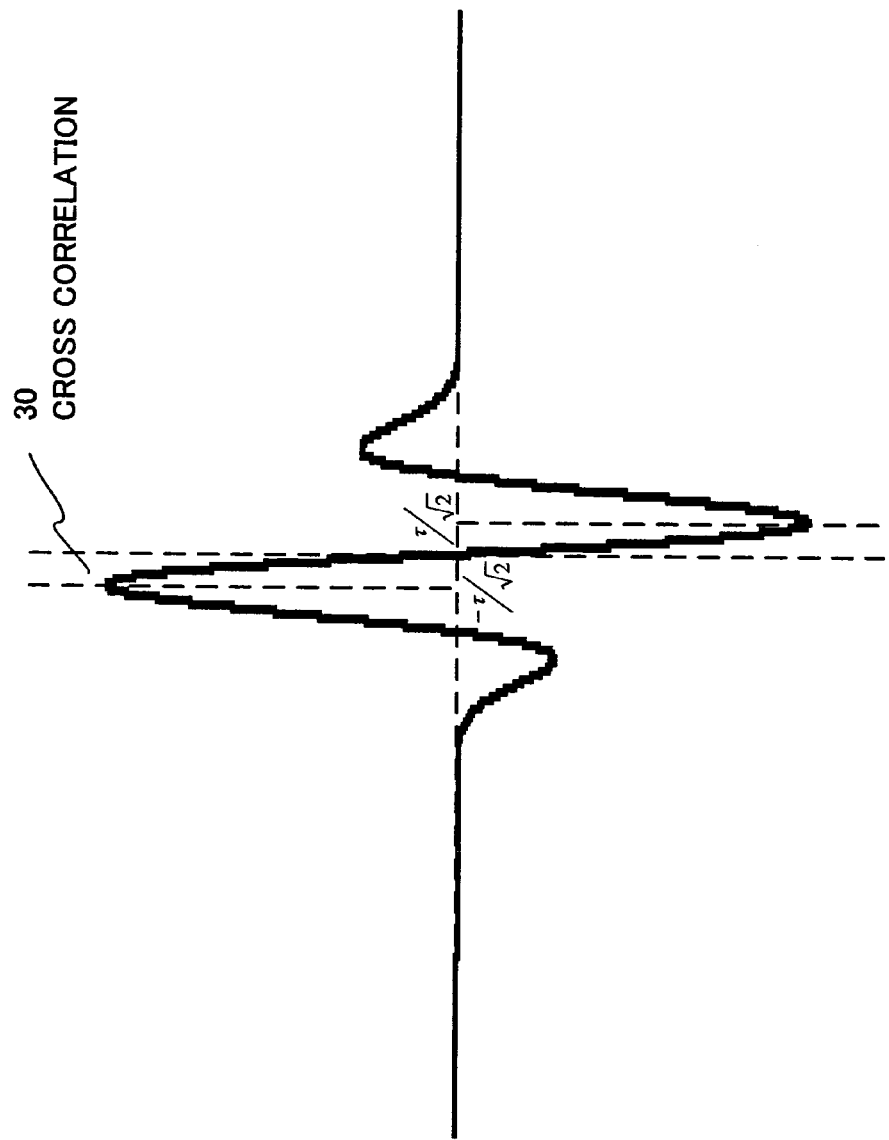
FIG. 3 is a graph, illustrating the cross-correlation between the monocycle in FIG. 1 and the template in FIG. 2.
Figure 4:
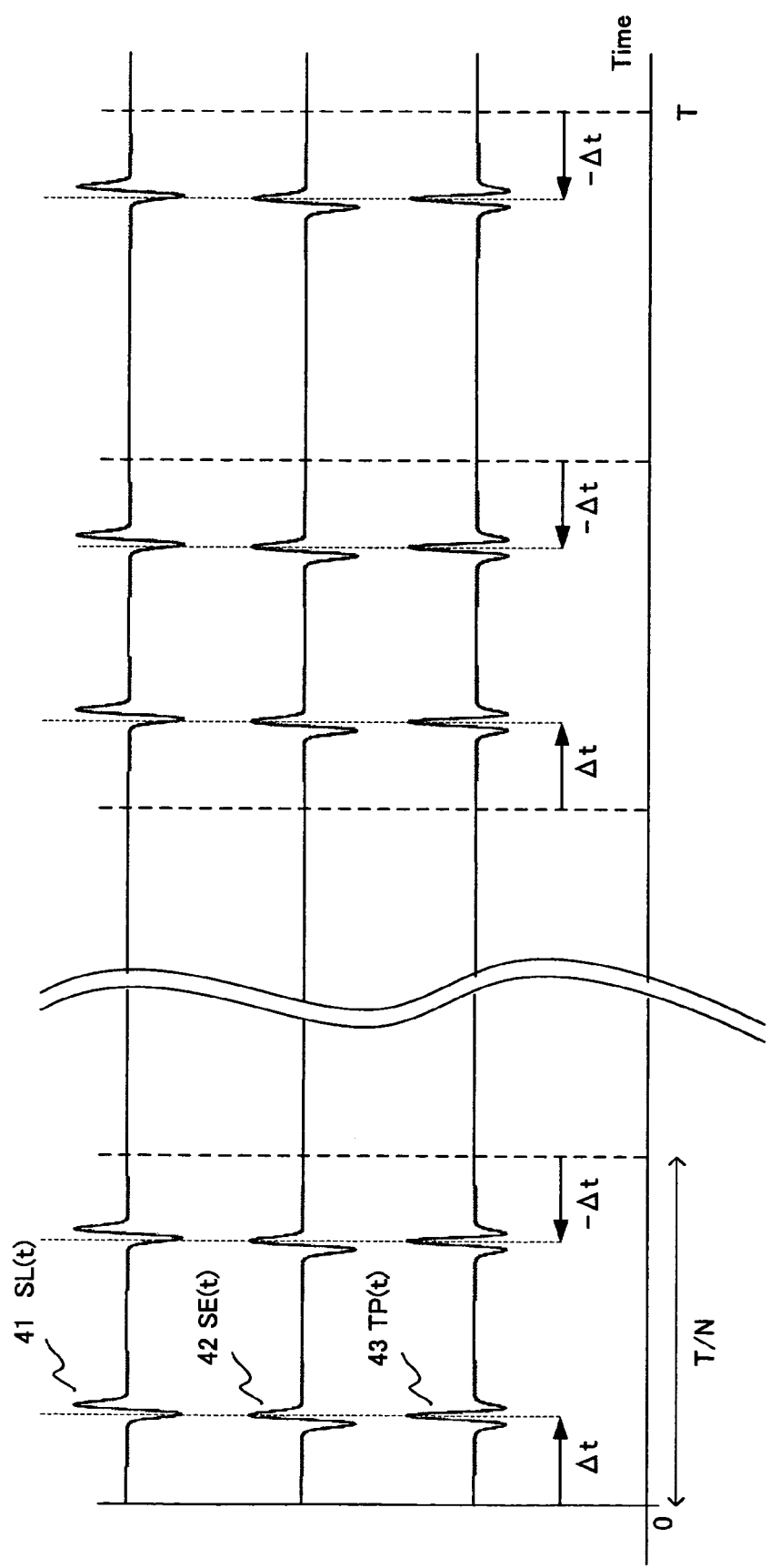
FIG. 4 is an waveform chart, illustrating an example of an impulse train for data transmission and an example of a template train for reception and demodulation, both being used for impulse radio.

The template generator 503 generates a template train 502 (time-series signal) which is identical with a template train 43 described as TP(t) in FIG. 4. This template train 502 is a signal in which a monocycle is repeated for N times. The template train 502 is, as described above, generated at the above-described instant determined by varying an average transmission interval T/N by a pseudo-random code.

The multiplier 501 multiplies the input signal 500 by the template train 502, and outputs the result of the multiplication. The adder 504 adds the output from the multiplier 501 to an output from the quantizer 506 and outputs the result of the addition.

The analog integrator 505 is an analog circuit which outputs an integration value figured out by integrating the output from the adder 504. The quantizer 506 is a circuit which quantizes the output from the analog integrator 505, and output a digital (quantized) integration value. The digital integrator 508 outputs the digital integration value, which has been supplied from the analog integrator 505, as a correlation value. The digital value from the quantizer 506 is supplied to the adder 504 via a negative feedback path 507.

The above-described template generator 503, the quantizer 506, and the digital integrator 508 operate in accordance with the timing of a clock 510.

Next, the operation of the above-mentioned correlator 50 will be described.

First, the input signal 500 is represented as x(t) which is a function of a time instant t, and the template train 502 generated in the template generator 503 is represented as y(t) which is a function of a time instant t. A cycle of the template train is represented as T, an interval that the quantizer 506 quantizes the output from the analog integrator 505 is represented as ΔT, and T/ΔT=M. Further, time instants at which the quantizer 506 samples and quantizes the output from the analog integrator 505 are represented as . . . , $T_i$, $T_{i+1}$, . . . , and provided that the output from the analog integrated 505 at the time instant $T_i$ is represented as $f(T_i)$, the output from the quantizer 506 at the time constant $T_i$ is represented as $q(T_i)$, and a quantization error is represented as δi, the following Equation 2 stands.

$$f(T_j)=q(T_j)-\delta_j \quad \text{[Equation 2]}$$

Assuming that a start time instant of one template train is $T_i$ and an end time instant thereof is $T_{i+M}$, an output $f(T_{i+M})$ from the analog integrator 505 at the time instant $T_{i+M}$ is represented as Equation 3.

$$\begin{aligned}f(T_{i+M}) &= \int_0^{T_i}(x(t)y(t)-Aq(t))dt \int_{T_i}^{T_{i+M}}(x(t)y(t)-Aq(t))dt \quad \text{[Equation 3]}\\&= f(T_i) + \int_{T_i}^{T_{i+M}}(x(t)y(t)-Aq(t))dt\\&= q(T_i)-\varepsilon_i + \int_{T_i}^{T_{i+M}}x(t)y(t)dt - \int_{T_i}^{T_{i+M}}Aq(t)dt\\&= q(T_i)-\varepsilon_i + \int_{T_i}^{T_{i+M}}x(t)y(t)dt - \sum_{k=i}^{i+M-1}q(T_k)dt\\&= -\varepsilon_i + \int_{T_i}^{T_{i+M}}x(t)y(t)dt - \sum_{k=i+1}^{i+M-1}q(T_k)dt\end{aligned}$$

In Equation 3, A indicates a gain of the negative feedback path 507, and A=N/T. In the meantime, since Equation 4 is obtained from Equation 2, substituting Equation 4 for the left side of Equation 3 results in Equation 5.

$$f(T_{i+M})=q(T_{i+M})-\varepsilon_{i+M} \quad \text{[Equation 4]}$$

$$\int_{T_i}^{T_{i+M}}x(t)y(t)dt = -\varepsilon_{i+M}+\varepsilon_i+\sum_{k=i+1}^{i+M}q(T_k) \quad \text{[Equation 5]}$$

According to Equation 5, the left side which is a correlation value between the input signal x(t) and the template train y(t) during a period between the time instants $T_i$ and $T_{i+M}$ can be quantized as in the third term of the right side, and the quantization error on this occasion is given by $-\varepsilon_{i+M}+\varepsilon_i$. In reality, the digital integrator 508 performs integration when receiving an output $q(T_k)$ from the quantizer 506, and then outputs the above-mentioned value of the third term of the right side, as a value of the digital correlation output signal 509.

Note that, if the analog integrator 505 is reset at the time instant $T_i$ and $f(T_i)=0$ is met, the quantization error $\varepsilon_i$ up until this period is 0, and this ensures further decrease of the quantization error.

The reset of the analog integrator 505 is, for instance, performed by turning on a switch (not illustrated) for discharging integrated electric charges. A signal for switching on/off the switch is either periodically generated in accordance with a clock by means of a counter or generated by a CPU for controlling the receiver.

Using the correlator 50 of the present embodiment, the left side of Equation 4, which is the correlation value during the time instant $T_i$ to the time instant $T_{i+M}$ can be quantized as in the third term of the right side, and the quantization error thereof is given by either $-\varepsilon_{i+M}+\varepsilon_i$ or $-\varepsilon_{i+M}$.

However, if the negative feedback path 507 illustrated in FIG. 5 is not provided, the quantization errors arisen each time the quantization is performed are accumulated for M times, during the period from the time instant Ti+l to the time instant Ti+M. Thus, when the negative feedback path 507 is provided, the SN ratio improves in proportion to the square root of M.

[Second Embodiment]

Figure 6:
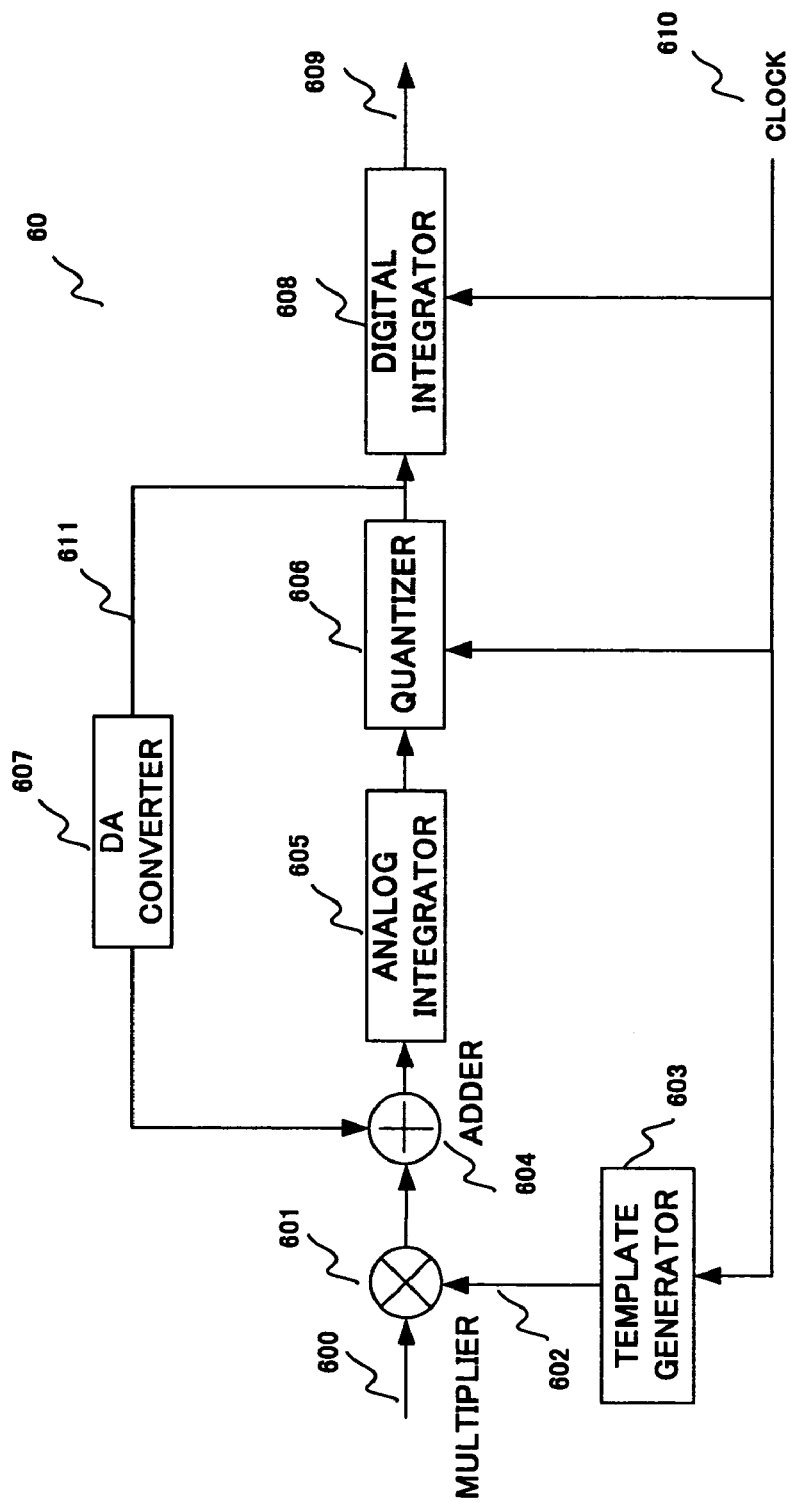
FIG. 6 is a block diagram, illustrating a substantial part of a correlator in accordance with Second Embodiment of the present invention.

The following will describe Second Embodiment of the present invention, with reference to FIG. 6.

To a correlator 60 in accordance with the present embodiment, an input signal 600 which is an impulse train is supplied from an impulse radio transmitter, and the correlator 60 calculates a correlation value between this input signal and a template train 602 so as to output the result of the calculation as a digital correlation output signal 609.

The correlator 60 is arranged so as to be identical with the correlator 50, except a DA converter 607. In other words, a multiplier 601, a template generator 603, an adder 604, an analog integrator (integrator) 605, a quantizer 606, and a digital integrator 608 are equivalent to the template generator 503, adder 504, analog integrator 505, quantizer 506, and digital integrator 508, respectively.

The DA converter 607 is provided on a negative feedback path 611, and converts the output supplied from the quantizer 606 to an analog signal and outputs the converted signal to the adder 604.

The template generator 603, the quantizer 606, and the digital integrator 608 operate in accordance with the timing of a clock 610.

In the case of the correlator 50, the quantizer 506 performs binary quantization. Thus, since a binary digital output represented as, for instance, +1 and −1 can be regarded as an analog signal, the signal can be negatively fed back to the adder 504 without any modification.

In contrast, in the case of the correlator 60, the quantizer 606 may deal with 3 or more quantized values. Thus, since the quantized output generally cannot be regarded as an analog value, the output is converted to an analog value by the DA converter 607, and then negatively fed back to the adder 604. On this account, the DA converter 607 is provided between the quantizer 606 and the adder 604 and connected to the both members.

Also in this case, the equations described in Embodiment 1 stand. For this reason, as an output from the digital integrator 608, a desirable correlation value with reduced quantization errors can be outputted.

[Embodiment 3]

Figure 7:
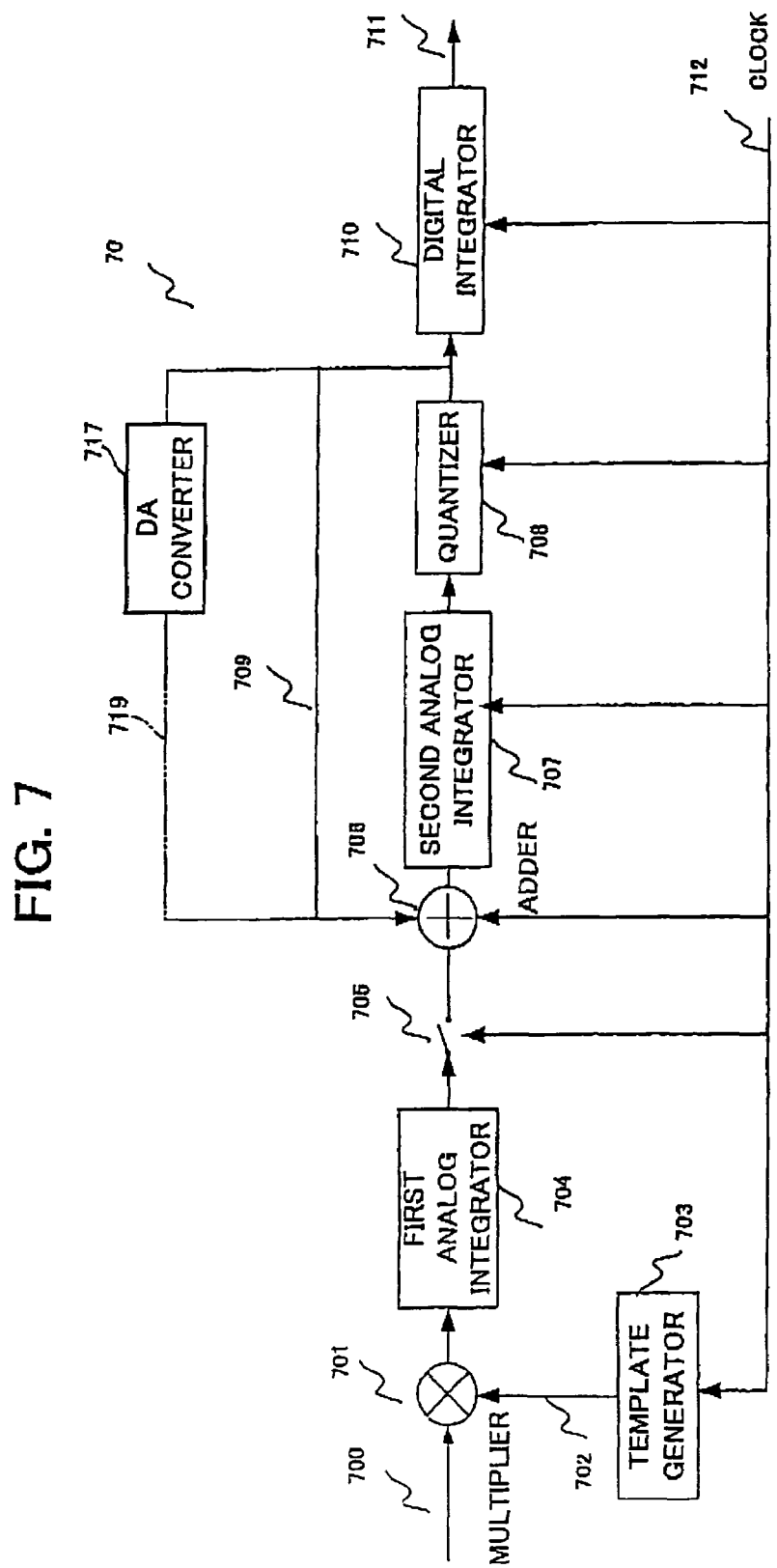
FIG. 7 is a block diagram, illustrating a substantial part of a correlator in accordance with Third Embodiment of the present invention.

The following will describe Embodiment 3 of the present invention with reference to FIG. 7.

To a correlator 70 in accordance with the present embodiment, a signal 700 is supplied from an impulse radio transmitter. The correlator 70 calculates a correlation value between the supplied signal and a template train 702, and outputs the result of the calculation as a digital correlation value 711.

The correlator 70 includes a multiplier 701, a template generator 703, a first analog integrator (first integrator) 704, a sampling switch (switching circuit) 705, an adder 706, a second analog integrator (second integrator) 707, a quantizer 708, a negative feedback path 709, and a digital integrator (third integrator) 710.

The multiplier 701 and the template generator 703 are equivalent to the above-described multiplier 501 and template generator 503, respectively.

The first analog integrator 704 is an analog circuit which integrates the output supplied from the multiplier 701 and outputs the resultant integration value. The sampling switch 705 samples the output from the first analog integrator 704, at predetermined sampling intervals determined in accordance with a clock 712, so as to output the sampled signal.

The adder 706 adds the output from the sampling switch 705 to the output from the quantizer 708, and outputs the result of the addition. The second analog integrator 707 is an analog circuit which integrates the output supplied from the adder 706, and outputs the resultant integration value. The quantizer 708 is a circuit which quantizes the output from the second analog integrator 707, and outputs a digital integration value.

The digital integrator 710 outputs the digital integration value (quantized integration value) supplied from the quantizer 708, as a digital correlation value (digital correlation output signal) 711. Further, the digital value (quantized integration value) is supplied from the quantizer 708 to the adder 706 via the negative feedback path 709.

The above-described template generator 703, sampling switch 705, adder 706, quantizer 708, and digital integrator 710 operate in accordance with the timing of the clock 712.

Next, the operation of the above-mentioned correlator 70 will be described.

In the present embodiment, the input signal 700 and the template train 702 are multiplied in the multiplier 701, and the result of the multiplication is, first of all, integrated by the first analog integrator 704. The output from the analog integrator 704 is sampled by the sampling switch 705 at predetermined sampling intervals, and then supplied to the adder 706, as a discrete-time analog signal.

Also to the adder 706, the output from the quantizer 708 is negatively fed back via the negative feedback path 709. As in the case of the DA converter 607 in the correlator 60 of Second Embodiment, the negative feedback path 709 may be replaced with a negative feedback 719 path including a DA converter 717 for converting the output, supplied from the quantizer 708, to an analog value.

As a discrete-time analog value, the output from the adder 706 is integrated by the second analog integrator 707, sampled at predetermined sampling intervals in accordance with the clock 712, and then quantized by the quantizer 708. The output from the quantizer 708 is supplied to the digital integrator 710 and integrated thereby, then outputted as the digital correlation value 711.

In the present embodiment, the first analog integrator 704 is preferably an integrator which can perform attenuation. In this connection, it is preferable that a time constant of the attenuation is a value which allows (i) the product of a monocycle and a template to be precisely integrated, and (ii) the attenuation to be sufficiently performed before the next monocycle.

Even if an integrator which does not have the above-described attenuation characteristics so that the holding time thereof is relatively long is adopted as the first analog integrator 704, it is possible to construct a desirable correlator by resetting the first analog integrator 704 after the sampling switch samples the integration value.

Further, in the correlator 70 of the present embodiment, the first analog integrator 704 requiring quick response and the second analog integrator 707 having a long holding time can be provided to be independent from each other. As described below, this arrangement makes it possible to reduce the power consumption of the first and second analog integrators 704 and 707.

Since a frequency band of an integrator is in inverse proportion to a load-carrying capacity, it is necessary to reduce the capacity for integration, in order to reduce the power consumption while keeping a necessary frequency band. In contrast, since a time constant of attenuation characteristics of an integrator is in inverse proportion to an integration capacity, it is necessary to increase the integration capacity to keep a sufficient length of holding time.

Concerning this, the first and second analog integrators 704 and 707 are provided to be independent from each other. Thus, the load-carrying capacity of the first analog integrator 704 is reduced and as a result the power consumption thereof is reduced, while the output from the first analog integrator 704 is integrated by the second analog integrator 707 which operates at a low speed, uses less power, and has a long holding time. Thus, it is possible to reduce the overall power consumption.

[Fourth Embodiment]

Figure 8:
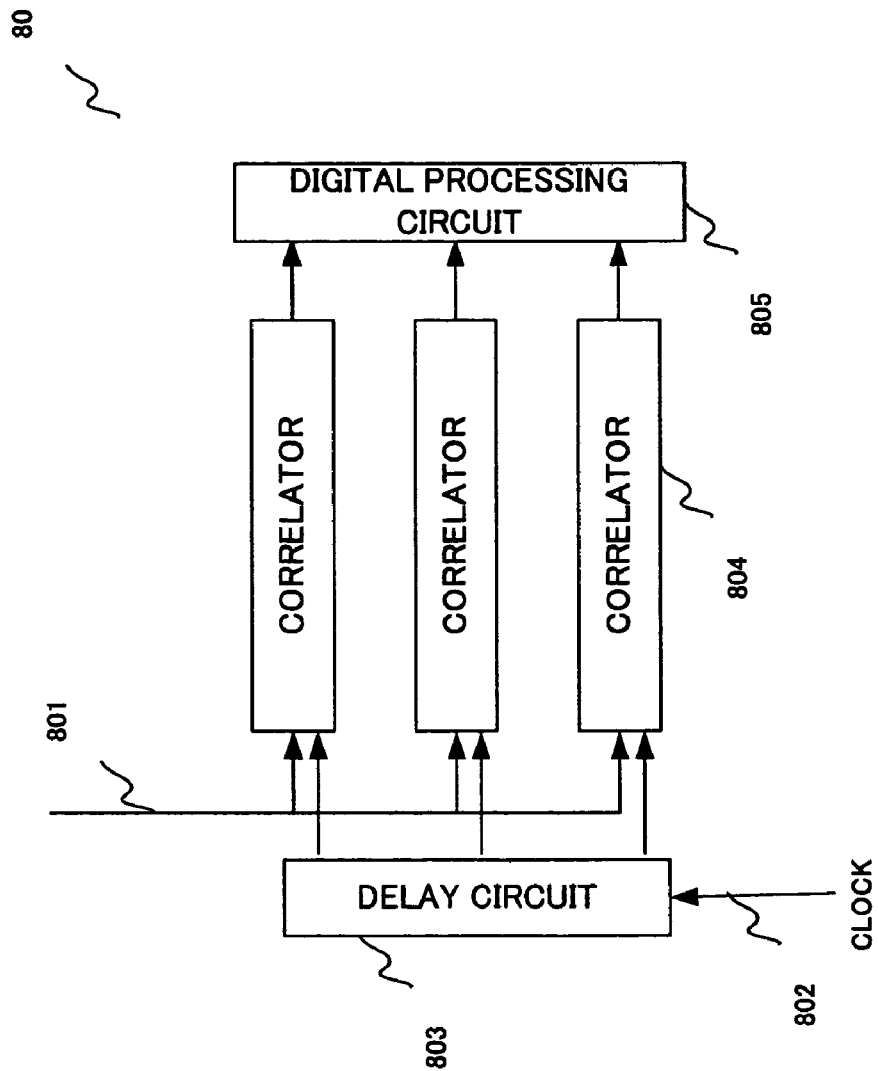
FIG. 8 is a block diagram, illustrating a substantial part of a parallel correlator in accordance with Fourth Embodiment of the present invention.

The following will describe Fourth Embodiment of the present invention with reference to FIG. 8.

To a parallel correlator 80 of the present embodiment, a signal 801 is supplied from an impulse radio transmitter. The parallel correlator 80 calculates respective correlation values between the supplied signal and a plurality of template trains having different phases, using a plurality of correlators, and outputs the results of the calculation to a digital processing circuit 805.

More specifically, the parallel correlator 80 includes: a plurality of correlators 804; a delay circuit 803 which generates a plurality of clocks having different phases, from a referential clock 802, and then supplies the generated clocks to the respective correlators 804; and a digital processing circuit 805 which performs processing in reaction to the receipt of the outputs from the respective correlators 804. Each of the correlators 804 is at least one of the correlators 50, 60, and 70 (cf. FIGS. 5-7) for impulse radio, which have been described in one of Embodiments 1-3.

With this arrangement, the correlations between the respective template trains having different phases and the input signal can be calculated in a parallel manner and this makes it possible to effectively utilize this calculation for operations such as the acquisition and tracking of synchronization with the input signal.

[Fifth Embodiment]

Figure 9:
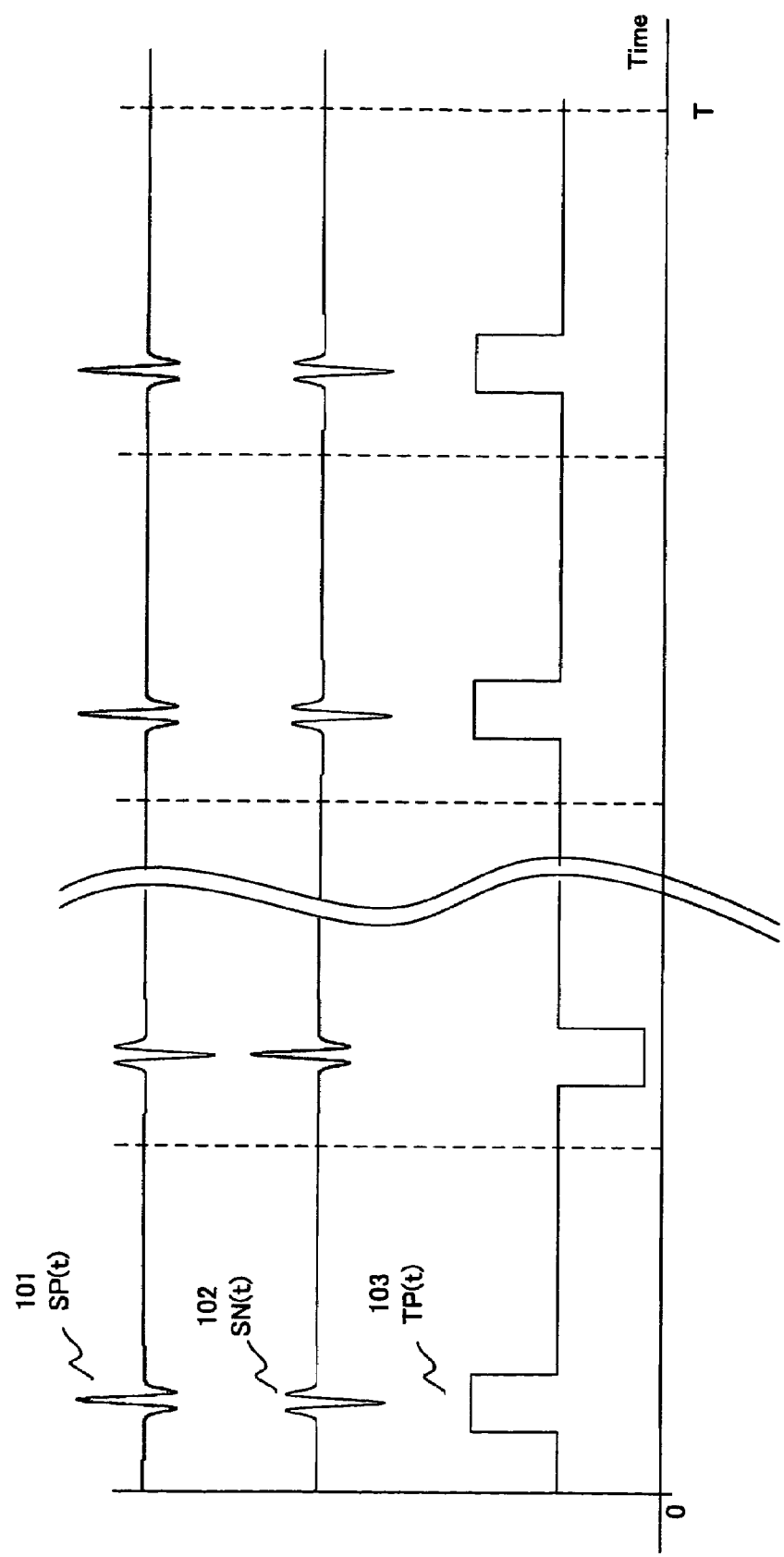
FIG. 9 is a waveform chart, illustrating an example of another pulse train for data transmission and an example of a template train for reception and demodulation, the both trains being used in Fifth Embodiment of the present invention.
Figure 10:
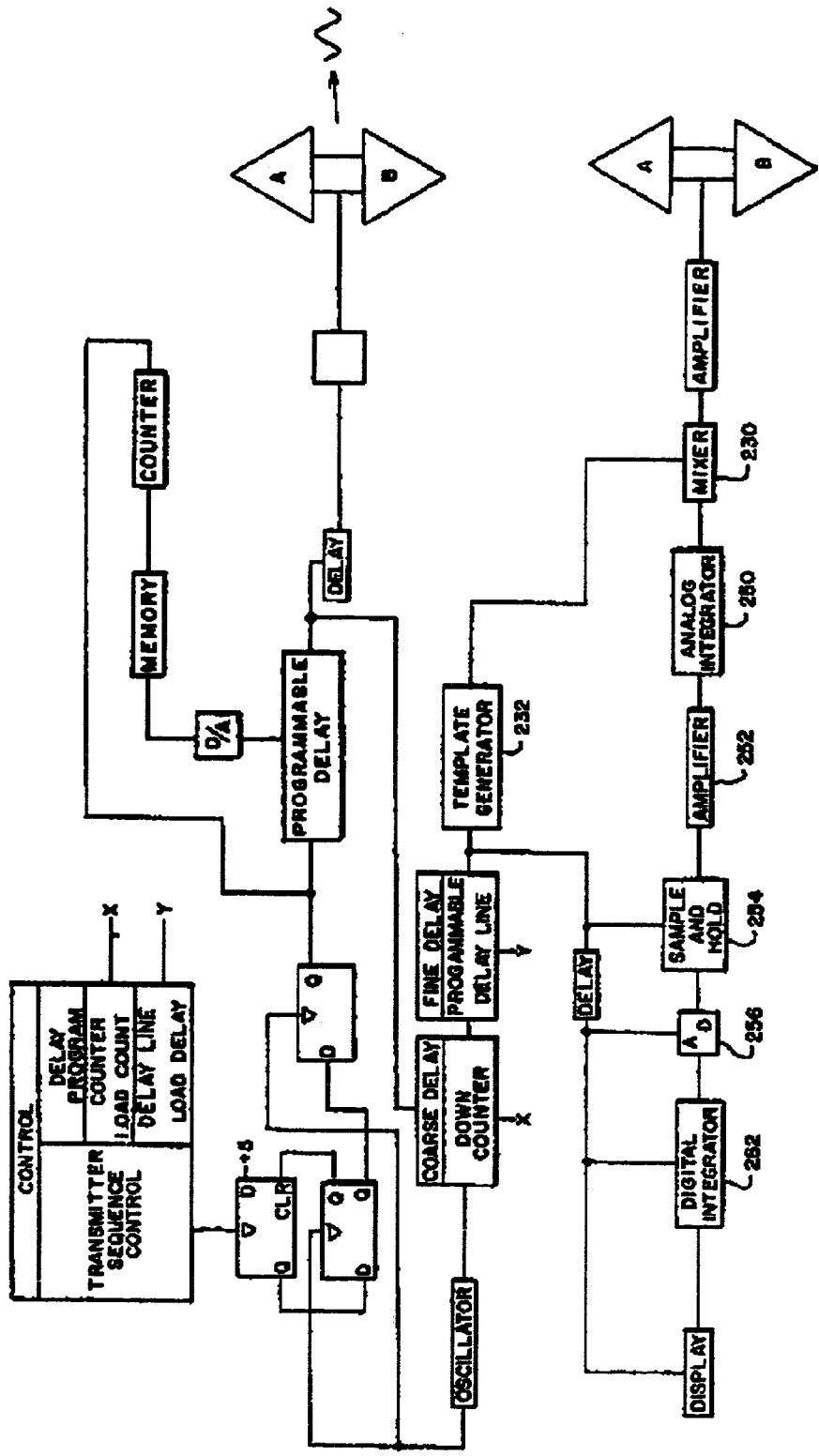
FIG. 10 is a block diagram, illustrating an arrangement of a radar device including a conventional correlator.

The following will describe Fifth Embodiment of the present invention in reference to FIG. 9.

In First to Fourth Embodiments of the present invention, examples adopting a Pulse Position Modulation (PPM) method are described. However, it is possible to adopt any modulation methods which can be adopted to transmission methods using digital modulation, especially to impulse radio. Thus, as in FIG. 9, it is possible to adopt Binary Phase Shift Keying (BPSK) modulation instead of the above-mentioned PPM. Further, it is also possible to adopt Quadrature Phase Shift Keying (QPSK) modulation or Pulse-Amplitude Modulation.

A concrete example of this is such that BPSK modulation is performed by giving pulse code by a Pseudo Noise (PN)

sequence. As illustrated in FIG. 9, a correlator adopting this BPSK modulation uses a signal 101 which is SP(t) produced by BPSK-modulating data "1" by a PN sequence, and a signal 102 which is SN(t) produced by BPSK-modulating data "−1" by the PN sequence. Further, as indicated by TP(t), a rectangular wave can be adopted as a template 103.

Incidentally, Japanese Laid-Open Patent Publication No. 2001-44891 (Tokukai 2001-44891; published on Feb. 16, 2001 corresponding to U.S. Pat. No. 6,493,404) discloses a correlator for calculating correlation between an input signal and a code sequence which is a discrete-time signal.

In contrast to this, the correlator of the present invention is for calculating correlation between an input signal and a predetermined continuous-time signal (template train), and what is supplied to the first integrator is a continuous-time signal (signal which is not sampled). Also, the correlator of the present invention is different from the correlator of the above-mentioned document, to the extent that each of the correlators described in the respective embodiments of the present invention includes a template generator for generating a template train.

To achieve the above-mentioned objective, a correlator of the present invention is characterized by comprising: a multiplier for multiplying the predetermined time-series signal by the input signal; an integrator for integrating an output (i) from the multiplier; a quantizer for quantizing an output (ii) from the integrator; and a negative feedback path for negatively feeding an output (iii) from the quantizer back to the integrator.

According to this arrangement, a quantizer output, which is produced by quantizing an output from an analog integrator, is negatively fed back to the analog integrator via a negative feedback path, so that a quantization error in the quantizer output, which has been arisen in the process of quantization, is integrated by the analog integrator, and then quantized by the quantizer again. Thus, it is possible to significantly reduce the quantization error.

To achieve the foregoing objective, another correlator of the present invention is characterized by comprising: a multiplier for multiplying the predetermined time-series signal by the input signal; a first integrator for integrating an output (a) from the multiplier; a sampling circuit for sampling an output (b) from the first integrator; a second integrator for integrating an output (c) from the sampling circuit; a quantizer for quantizing an output (d) from the second integrator; and a negative feedback path for negatively feeding an output (e) from the quantizer back to the second integrator.

According to this arrangement, a quantization error can be significantly decreased as in the foregoing correlator of the present invention. Further, since the first integrator requiring quick response and the second integrator having a long holding time are provided to be independent from each other, the power consumption of the integrators can be reduced. More specifically, the load-carrying capacity of the first integrator is reduced and as a result the power consumption thereof is reduced, while the output from the first integrator is integrated by the second analog integrator which operates at a low speed, uses less power, and has a long holding time. Thus, it is possible to reduce the overall power consumption.

Further, the first integrator is preferably an integrator which attenuates at a certain time constant. According to this arrangement, when the time constant is a value which allows (i) the product of a monocycle and a template (time-series signal) to be precisely integrated, and (ii) an attenuation time constant to be sufficiently attenuated before the next monocycle, it is unnecessary to reset the first integrator.

Moreover, a parallel correlator of the present invention may be composed of a plurality of the above-mentioned correlators. According to this arrangement, in a receiver for impulse radio, it is possible to restrain the increase of the power consumption so as to decrease a quantization error (i.e. improve a S/N ratio), on the occasion of calculating the correlations between respective template trains having different phases and the input signal in a parallel manner.

A receiver of the present invention includes any one of the foregoing correlators. With this arrangement, communication characteristics are improved thanks to the correlator with reduced quantization error, which can improve a S/N ratio.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A correlator, which figures out a correlation between an input signal which is an impulse train and a template train which is a predetermined time-series signal, comprising:
   a template train generator for generating the template train which is a signal in which a template is repeated;
   a multiplier for calculating through multiplication a correlation value between the template train and the impulse train;
   a first integrator for integrating an output of the multiplier;
   a quantizer for quantizing an output of the first integrator; and
   a negative feedback path for negatively feeding an output of the quantizer back to the first integrator.

2. The correlator as defined in claim 1, further comprising:
   an adder which adds the output of the multiplier to the output of the quantizer and supplies an output to the first integrator.

3. The correlator as defined in claim 1, further comprising:
   a second integrator for integrating the output of the quantizer.

4. The correlator as defined in claim 1, further comprising:
   a converter provided on the negative feedback path, which converts a digital signal to an analog signal.

5. The correlator as defined in claim 1, wherein, the input signal is the impulse train which has been subjected to pulse position modulation in accordance with digital data.

6. The correlator as defined in claim 5, wherein, the predetermined time-series signal is generated in accordance with impulses of the impulse train, the impulses being different from each other.

7. The correlator as defined in claim 1, wherein, the input signal is the impulse train which has been subjected to BPSK modulation in accordance with digital data.

8. The correlator as defined in claim 7, wherein, the predetermined time-series signal is composed of rectangular waves corresponding to the impulse train.

9. The correlator as defined in claim 1, wherein the quantizer performs binary quantization.

10. The correlator as defined in claim 1, wherein
    the impulse train is a signal in which a monocycle is repeated, and
    the template train is a signal in which a template obtained from two monocycles is repeated.

11. The correlator as defined in claim 1, wherein the impulse train is a signal having been subjected to pulse position modulation.

12. The correlator as defined in claim 1, further comprising:
synchronization means for synchronizing the template train with the impulse train.

13. A parallel correlator, comprising a plurality of correlators being parallel to each other, each of the plurality of correlators, which figures out a correlation between an input signal which is an impulse train and a template train which is a predetermined time-series signal, including:
a template train generator for generating the template train which is a signal in which a template is repeated;
a multiplier for calculating through multiplication a correlation value between the template train and the impulse train;
an integrator for integrating an output of the multiplier;
a quantizer for quantizing an output of the integrator; and
a negative feedback path for negatively feeding an output of the quantizer back to the integrator.

14. The parallel correlator as defined in claim 13, further comprising a delay circuit for regulating a clock supplied to the plurality of correlators.

15. A correlator which figures out a correlation between an input signal which is a pulse train and a predetermined time-series signal, comprising:
a multiplier for multiplying the input signal by the predetermined time-series signal;
a first integrator for integrating an output of the multiplier;
a sampling circuit for sampling an output of the first integrator;
a second integrator for integrating an output of the sampling circuit;
a quantizer for quantizing an output of the second integrator; and
a negative feedback path for negatively feeding an output of the quantizer back to the second integrator.

16. The correlator as defined in claim 15, wherein, the first integrator is an integrator which attenuates at a certain time constant.

17. The correlator as defined in claim 15, further comprising an adder which adds the output of the sampling circuit to the output of the quantizer and supplies an output to the second integrator.

18. The correlator as defined in claim 15, further comprising a third integrator for integrating the output of the quantizer.

19. The correlator as defined in claim 15, further comprising a converter provided on the negative feedback path, which converts a digital signal to an analog signal.

20. The correlator as defined in claim 15, wherein, the input signal is an impulse train which has been subjected to pulse position modulation in accordance with digital data.

21. The correlator as defined in claim 20, wherein, the predetermined time-series signal is generated in accordance with impulses of the impulse train, the impulses being different from each other.

22. The correlator as defined in claim 15, wherein, the input signal is the pulse train which has been subjected to BPSK modulation in accordance with digital data.

23. The correlator as defined in claim 22, wherein, the predetermined time-series signal is composed of rectangular waves corresponding to the pulse train.

24. A receiver, comprising a correlator which figures out a correlation between an input signal, which is an impulse train and a template train which is a predetermined time-series signal, the correlator including:
a template train generator for generating the template train is a signal in which a template is repeated;
a multiplier for calculating through multiplication a correlation value between the template train and the impulse train;
an integrator for integrating an output of the multiplier;
a quantizer for quantizing an output of the integrator; and
a negative feedback path for negatively feeding an output of the quantizer back to the integrator.

* * * * *